No. 656,187. Patented Aug. 21, 1900.
E. GUNNELL.
HOSE CONNECTION.
(Application filed Jan. 8, 1900.)
(No Model.)
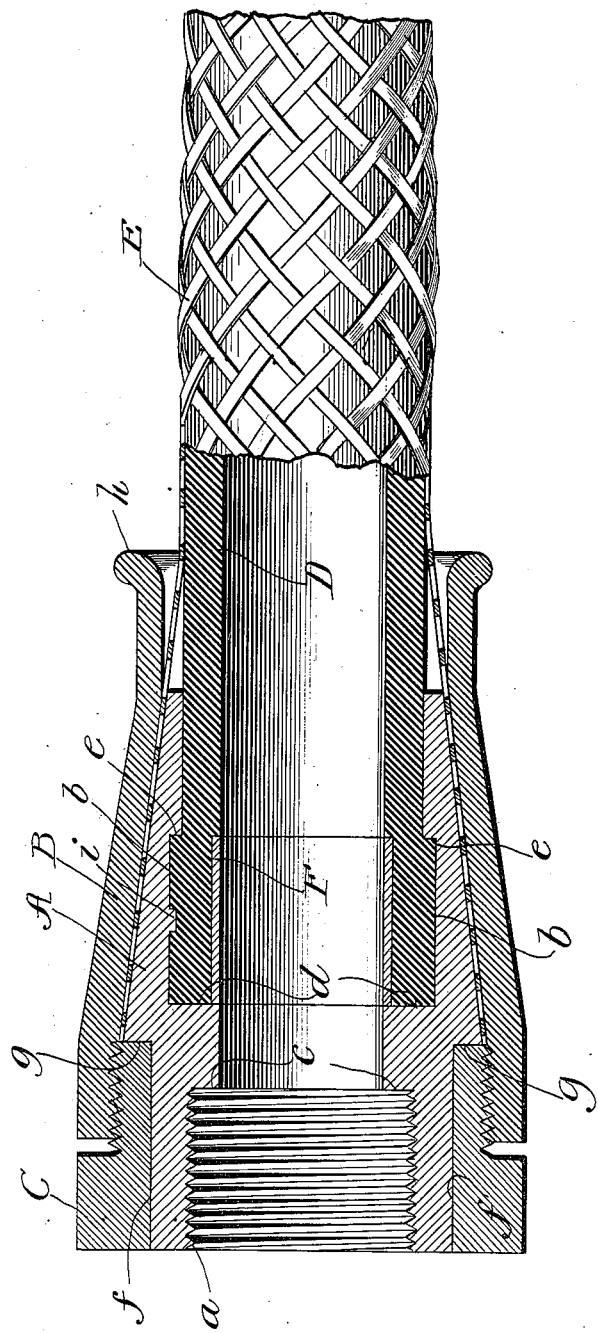
Witnesses
John H. Brokstrusi.
Bessie Shadbolt.
Inventor:
Elias Gunnell
By Edward R—
his Atty.

UNITED STATES PATENT OFFICE.

ELIAS GUNNELL, OF CHICAGO, ILLINOIS, ASSIGNOR OF ONE-HALF TO W. IRVING BABCOCK, OF SAME PLACE.

HOSE CONNECTION.

SPECIFICATION forming part of Letters Patent No. 656,187, dated August 21, 1900.

Application filed January 8, 1900. Serial No. 772. (No model.)

*To all whom it may concern:*

Be it known that I, ELIAS GUNNELL, a citizen of the United States of America, residing at Chicago, in the county of Cook and State of Illinois, have invented a certain new and useful Improvement in Hose Connections, of which the following is a description, reference being had to the accompanying drawing, forming a part hereof.

My improved hose connection has been designed more particularly for use in connection with hose provided with a protective covering, such as hereinafter described, but may also be employed with hose unprovided with such covering.

In the accompanying drawing, which exhibits the parts of my novel connection in section and a portion of the hose and its protective covering in elevation, A represents the inner and primary member of the combination of parts constituting my improved connection. The internal bore of this member A is divided into a threaded portion $a$ at its left-hand end, adapted to have screwed into it any suitable member of a hose-coupling or other connection, and an enlarged or circumferentially-grooved portion $b$, separated from the threaded portion by an intermediate contracted or reduced portion $c$. The portion $b$ connects with the portion $c$ by an annular shoulder $d$, against which the end of the hose is adapted to abut, as hereinafter described, while the opposite or right-hand end of the enlarged portion $b$ terminates in a small annular shoulder $e$, adapted to form a retaining-shoulder for the hose, also as hereinafter explained.

The exterior surface of the member A is composed of a reduced left-hand cylindrical portion $f$, which terminates at its right-hand end in an annular shoulder $g$. From the shoulder $g$ the exterior of the member A tapers inwardly toward the right to its right-hand extremity, as shown.

The second member of the combination consists of a tapered sleeve or coupling member B, adapted to fit over the tapered exterior of the member A and to project at its left-hand end beyond the shoulder $g$ of the member A, such projecting portion being internally screw-threaded to receive the externally-threaded reduced end of the nut C, which constitutes the third member of the combination.

D represents the rubber hose, which is shown as covered and protected by a sheet-metal lacework E of well-known construction and in extensive use for such purpose.

The parts are assembled and the end of the hose and its protective covering secured to the connection in the following manner: Assuming the three members A, B, and C to be unassembled and separately in hand, the member B is first slipped over the end of the hose and slid to the right along the same out of the way. An expansible metal ring F is then inserted in the end of the hose D, snugly fitting the internal bore of the latter, the lacework covering of the hose then crowded backward toward the right, and the uncovered end of the hose inserted into the member A until its end abuts against the shoulder $d$ of said member. The crowding of the lacing E toward the right will have considerably enlarged its diameter adjacent to its left-hand end, so that after the uncovered end of the hose has been slipped into the member A, as described, the left-hand end of the lacing E may be readily passed over the tapered exterior of the member A at the right-hand end of the latter and be forced along the same toward the left a considerable distance, such operation being aided, if necessary, by crowding the lacing E toward the left for some little distance along the portion of the hose extending to the right. The tapered sleeve or coupling member B is then slipped to the left along the hose and over the tapered exterior of the member A, confining the left-hand portion of the lacing E between the two. The nut C is then slipped over the reduced left-hand end of the member A and screwed into the internally-threaded left-hand end of the member B. As soon as the nut C has been screwed into the member A far enough for the end of the nut C to contact with the shoulder $g$ of the member A the further turning of the nut will draw the member B toward the left and cause it to tightly grip the portion of the laced covering E confined between it and the member A, thereby securely holding the end of such covering in place.

To firmly secure the end of the hose proper to the member A, the ring F, located in the extreme left-hand end of the hose, is expanded by means of a suitable instrument inserted through the member A from the left and forced outward to the position shown in the drawing, thereby seating itself in the body of the hose and compressing the latter and forcing it outward until it fills the enlarged portion $b$ of the internal bore of the member A and becomes confined therein by the annular shoulder $e$. This retaining-ring F is preferably expanded until its internal bore coincides with that of the hose proper and the contracted portion $c$ of the member A, so that the passage through the connection is of uniform diameter with that of the interior of the hose proper, so as to offer no obstruction to the fluid passing through the connection and hose. In such case the left-hand end of the ring F abuts against the shoulder $d$ and is confined thereby. It is not absolutely essential that such should be the case, since the seating of the ring in the body of the hose, caused by its expansion, will suffice to retain it and the hose in place, and the internal bore of the connection at $c$ might be made larger than shown; but it is preferable to have it coincide with the internal diameter of the hose and of the expanded ring F, as before stated.

The member B projects at its right-hand end some distance beyond the end of the member A and is outwardly flared at its extremity, as shown at $h$. The purpose of this extension of the member B and the shape given it is to prevent the hose being bent directly against the abrupt end of the member A at a sharp angle to the axis of the parts, which would have the effect of straining it and causing it to wear rapidly at that point. The extension of the member B prevents this, while the flaring shape given the end of the member B likewise prevents the hose being bent at a sharp angle against the abrupt shoulder, which would otherwise be formed by the end of the member B.

I have shown the member A provided with an internal circumferential rib or ring $i$, adapted to seat in the exterior of the hose D for the purpose of more securely connecting it to the member A; but it is not essential for this purpose and may be omitted. Likewise in the foregoing description of the assemblage of the parts I have described the end of the laced covering E as being secured to the connection by means of the sleeve B and nut C before the end of the hose proper has been finally secured in the member A by expanding the ring F; but this sequence of operation may be reversed.

The combination of parts constructed and arranged as above described constitutes a simple and efficient hose connection for use with hose provided with a protective covering like or similar to that shown in the drawing and constitutes my invention in its entirety and most advantageous form; but the member A, formed internally substantially as described, may be employed in combination with the retaining-ring F as a simple and efficient connection for hose unprovided with the protective covering. In such case the members B and C would be unnecessary and the member A would be given a plain exterior surface and terminated at its right-hand end in a flaring portion similar to the part $h$ of the member B.

Having thus fully described my invention, I claim—

1. The herein-described hose connection, comprising the member A adapted to receive within it the flexible hose D and to receive upon its tapered exterior the covering E of said hose, the sleeve B fitting upon the tapered exterior of the member A and adapted to clamp the covering E against said member, the nut C screwed into the end of the member B and abutting against the shoulder $g$ on the member A, and the retaining-ring F adapted to be expanded within the end of the hose D to confine the latter in the member A, substantially as described.

2. The herein-described hose connection, comprising the member A having the external cylindrical portion $f$ and tapered portion connected therewith by the shoulder $g$, and the circumferentially-enlarged internal portion $b$; the tapered sleeve B adapted to fit upon the tapered portion of the member A, and provided at one end with the flaring portion $h$ and at its opposite end with the internally-threaded portion projecting beyond the shoulder $g$; the nut C adapted to fit over the cylindrical portion $f$ of the member A and provided with the reduced externally-threaded portion adapted to engage the internally-threaded member B and abut against the shoulder $g$; and the ring F adapted to be expanded within the end of the hose to confine the same within the internal enlargement $h$ of the member A; substantially as described.

3. The herein-described hose connection, comprising the member A having the internally-threaded portion $a$, contracted portion $c$, and enlarged portion $b$ forming shoulders $d$ $e$ at its opposite ends, and having the external cylindrical portion $f$ and tapered portion connected therewith by the annular shoulder $g$; and the members B, C, and F coöperating therewith in the manner and for the purpose described.

ELIAS GUNNELL.

Witnesses:
C. W. FREY,
L. E. GEER.